D. L. NEWTON.
PROCESS OF DISTILLATION.
APPLICATION FILED SEPT. 11, 1918.
1,356,878.
Patented Oct. 26, 1920.
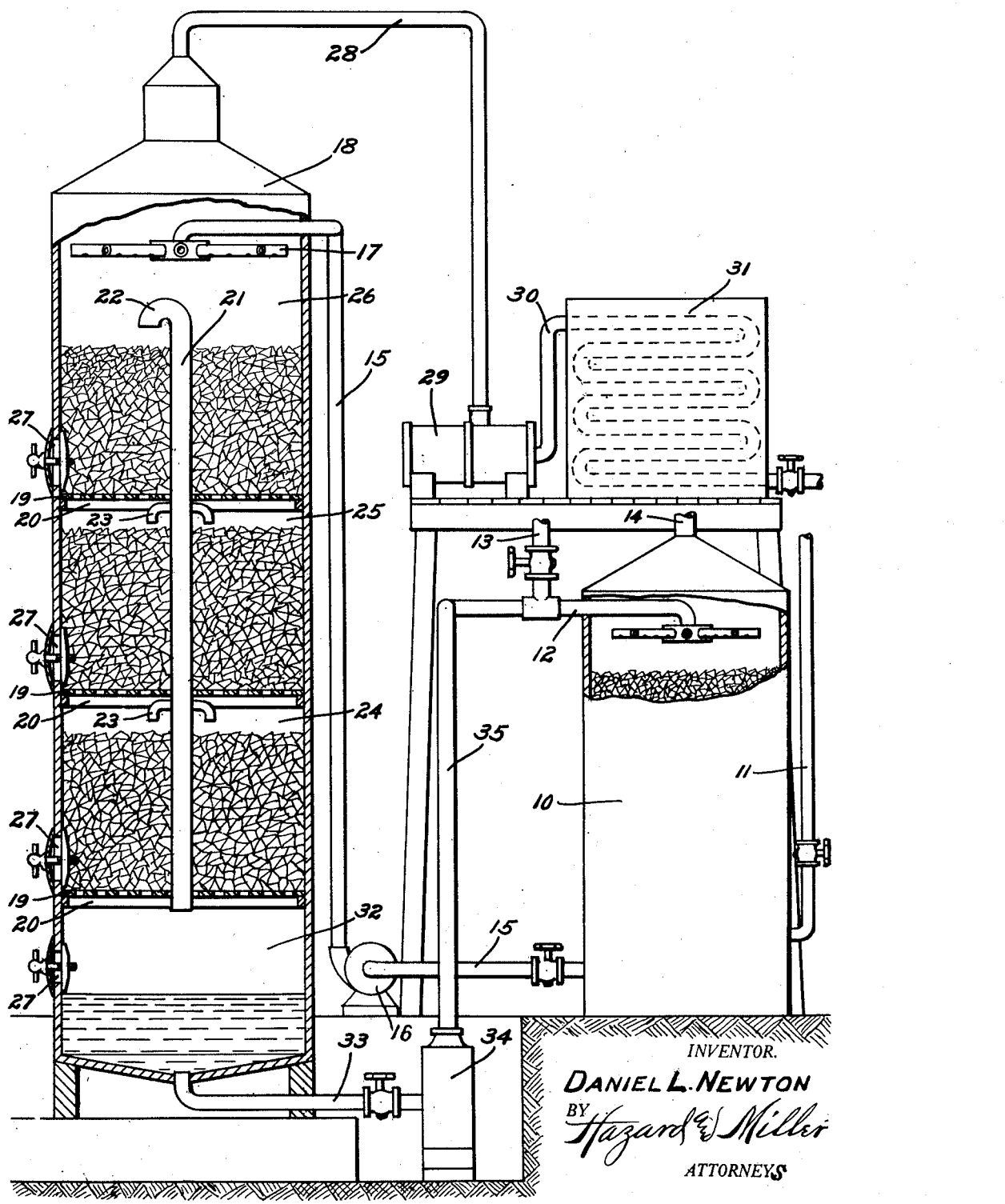
INVENTOR.
DANIEL L. NEWTON
BY
ATTORNEYS

United States Patent Office.

DANIEL L. NEWTON, OF FULLERTON, CALIFORNIA.

PROCESS OF DISTILLATION.

1,356,878.

Specification of Letters Patent.

Patented Oct. 26, 1920.

Application filed September 11, 1918. Serial No. 253,611.

*To all whom it may concern:*

Be it known that I, DANIEL L. NEWTON, a citizen of the United States, residing at Fullerton, in the county of Orange and State of California, have invented new and useful Improvements in Processes of Distillation, of which the following is a specification.

My invention relates to a process of distillation especially designed for the production of light hydrocarbons, such as gasolene.

In the absorption method of producing gasolene from natural gas the hydrocarbon vapors are caused to contact a fluid hydrocarbon, such as seal oil, which is preferably filmed in order to expose the greatest possible surface to the hydrocarbon vapors to be absorbed. A seal oil is a neutral mineral oil resembling kerosene, slightly yellowish in color, of 35° Bé. The seal oil saturated with hydrocarbon is treated by the ordinary methods of distillation to separate the absorbed hydrocarbons from the seal oil, the latter being continuously used in the cycle of operation for absorbing another quantity of hydrocarbon vapors.

My invention has for its object to devise an exceedingly simple, yet efficient, process of separating the absorbed hydrocarbons from the absorbent oil without the use of heat, by means of subjecting the saturated absorbent in the shape of a film to a partial vacuum, which may be progressively increased, if it is desired to separate hydrocarbons at progressively higher boiling points.

My invention consists in the steps of the process hereinafter described and claimed.

In the accompanying drawing, which forms a part of this specification, I have illustrated in vertical section the apparatus used in the carrying out of my process, said apparatus being shown connected up with other apparatus which is diagrammatically shown.

In the drawing, 10 indicates an absorber of the usual or any preferred type through which the hydrocarbon vapors and gases are conducted by means of a pipe 11, the same entering the absorber near the bottom thereof. The absorber 10 is filled with crushed rock, and the like, through which the absorbent hydrocarbon oil, such as seal oil, percolates, said oil being supplied to a spraying nozzle 12 communicating with the supply pipe 13. 14 is the gas and vapor outlet pipe at the top of the absorber 10. The absorbent oil now saturated with hydrocarbons is conducted through the valved outlet pipe 15 from the absorber 10 by means of a pump 16 to a spraying device 17 of any preferred construction which is disposed in the upper part of a vacuum still 18 which still in particular constitutes my present invention.

The still 18 is shown cylindrical in form and having disposed therein a series of foraminous baffle plates 19 supported on supporting rings 20. I have shown three baffle plates 19 although the number may be increased or decreased if desired. A vertical pipe 21 open at both ends passes centrally through all the baffle plates, the upper end of the pipe being bent over at 22 to prevent any of the saturated absorbent from passing into said pipe. 23 are downwardly bent necks communicating with the central pipe 21 and disposed in the upper part of compartments 24, 25 and 26 formed by the foraminous baffle plates 19 and the still 18. Crushed rock, or other suitable material, preferably granite, of a size to pass through a half inch or inch mesh screen is placed in the compartments 24, 25 and 26. 27 are manholes giving access to the various compartments of the still. A vapor outlet pipe 28 leads from the top of the still 18 to a vacuum pump and compressor 29 which conducts the compressed vapors through a pipe 30 to a condenser 31 of any preferred construction. 32 is the bottom compartment of the still 18 connecting the exhausted absorbent which is conducted by a valved controlled outlet pipe 33 to a pump 34 thence through pipe 35 to the sprayer 12 in the absorber 10 where it renews its cycle of operation.

In the operation the hydrocarbon vapors and gases are passed through the absorber 10 saturating the absorbent hydrocarbon oil which is conducted by means of pipe 15 and pump 16 to the top of the still 18 without preheating and preferably at ordinary temperatures, whence it is sprayed onto the crushed granite in the top compartment 26, whence it trickles and percolates successively over and through the layers of crushed granite in compartments 25 and 24. It may be here stated that the absorbent oil is preferably a petroleum distillate known in the trade as seal oil. About 14 gallons of seal oil are required for the absorption of one gallon of gasolene contained in the natural gas. The supply of the saturated oil is so controlled that a fine film is formed on the surface of the granite, thereby exposing an enormously large surface of the saturated oil to the action of the partial vacuum formed in the upper compartment 26 by means of the vacuum pump 29. The pipe 21 with the necks 23 serves to equalize the vacuum obtained in the still throughout the various compartments. The vacuum is gradually increased up to twenty-five inches which is equivalent to a temperature of 200° F. At this point, the vacuum has the same effect as if the saturated absorbent had been heated to 200° F. in distilling off the volatile hydrocarbons. The absorbent collecting in the bottom compartment 32 contains only those hydrocarbons which are not given off at this vacuum of twenty-five inches and which corresponds to 200° F. As stated before, the vacuum may be progressively increased and hydrocarbons at progressively higher boiling points may be condensed in the condenser 31. If such an operation is desired it will, of course, be necessary to pass the absorbent from chamber 32 repeatedly through the still 18.

While I have shown my apparatus in connection with the process of distilling gasolene by the absorption method it may be used independently thereof, and crude oil may at once be run through my still and "topped" to produce gasolene, I prefer to use iron shavings or coarse screens in place of the granite with the use of crude oil. Nor is my invention limited to the distillation of the lighter hydrocarbon, but may be used in connection with the distillation of any substances volatile at 200° F. or less.

Various changes in the steps of the process and in the construction, arrangement and combination of parts in the apparatus may be made by those skilled in the art without departing from the spirit of my invention as claimed.

I claim:

1. A process of distilling volatile substances comprising passing a liquid containing the volatile substance in the shape of a film through a distilling zone at substantially ordinary temperatures, creating a partial vacuum in said zone and removing the vapors liberated from the liquid.

2. A process of distilling light hydrocarbons, comprising passing a liquid hydrocarbon containing said light hydrocarbons in solution in the shape of a film through a distilling zone at substantially ordinary temperatures, creating a partial vacuum in said zone, and removing and condensing the vapors liberated from the liquid.

3. A process of distilling hydrocarbons, comprising passing a liquid hydrocarbon containing light hydrocarbons in solution in the shape of a film through a distilling zone at substantially ordinary temperatures, creating a partial vacuum in said zone, repeatedly passing said liquid through the distilling zone at progressively higher degrees of vacuum and removing and separately condensing the vapors liberated from the liquid.

In testimony whereof I have signed my name to this specification.

D. L. NEWTON.